July 2, 1957  B. J. ZUBRZYCKI  2,797,908
ZONING DEVICE FOR HORIZONTAL FLUO-SOLID BEDS
Filed May 10, 1956  2 Sheets-Sheet 1
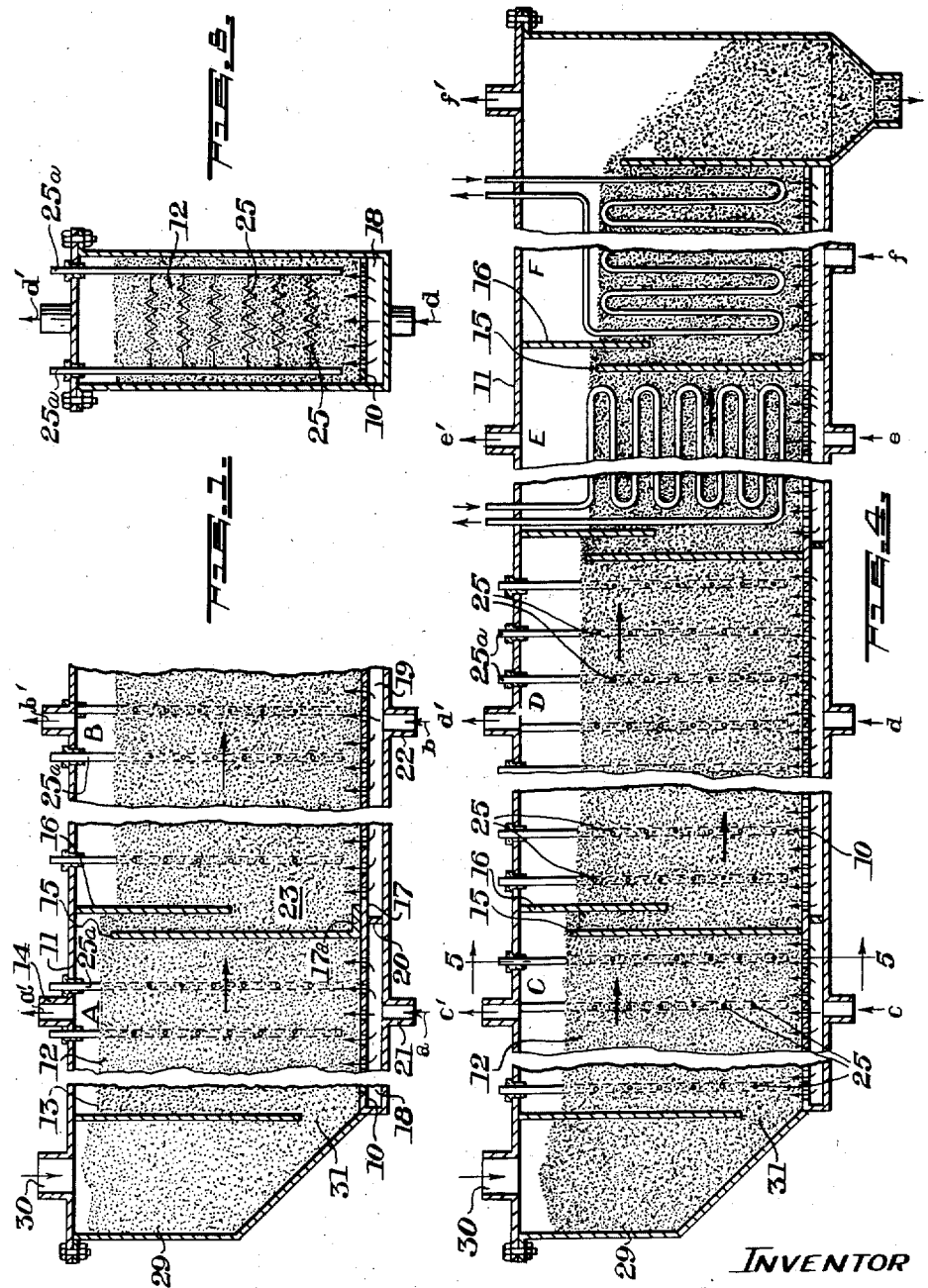
INVENTOR
BOLESLAW J. ZUBRZYCKI
BY Smart & Biggar
ATTORNEYS

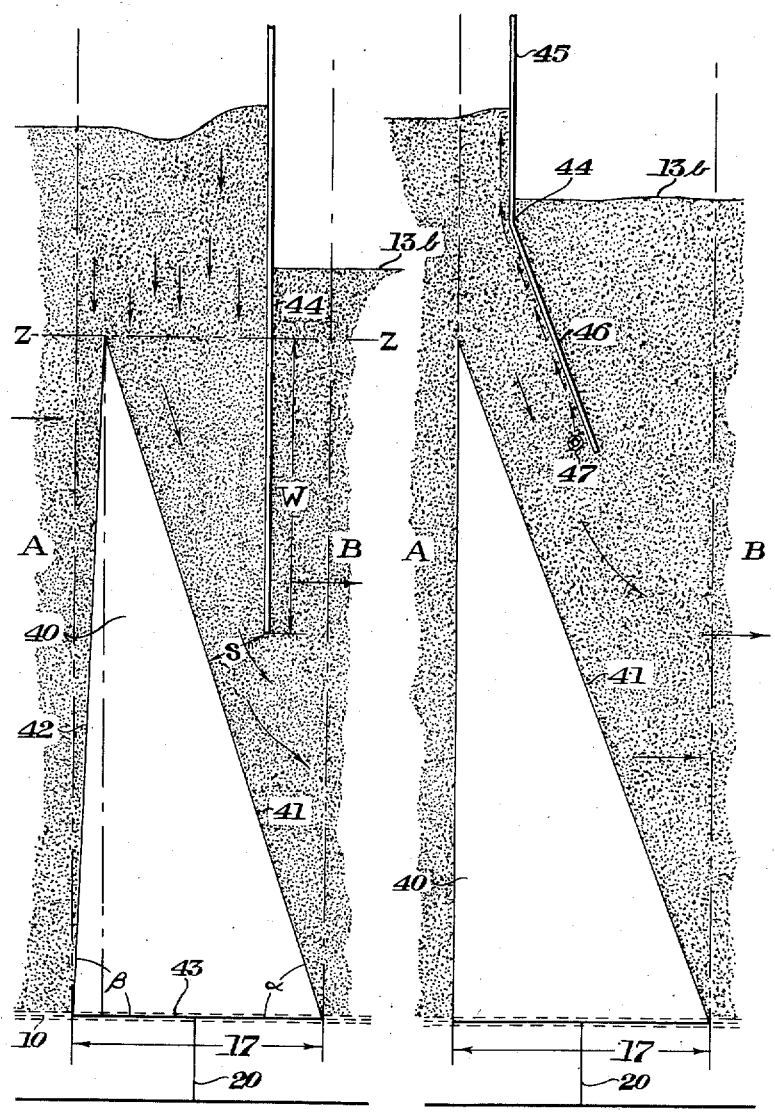

United States Patent Office 2,797,908
Patented July 2, 1957

2,797,908
ZONING DEVICE FOR HORIZONTAL FLUO-SOLID BEDS

Boleslaw Joseph Zubrzycki, Arvida, Quebec, Canada

Application May 10, 1956, Serial No. 584,125

9 Claims. (Cl. 263—21)

This invention relates to a zoning device for horizontally flowing fluidized solids beds.

It is a well-known phenomenon that when a gas is passed upwardly at a carefully controlled rate of flow through a bed of finely divided solid material, the bed can be made to behave in many respects like a bed of liquid. In this condition a bed is generally referred to as being "fluidized." Many practical applications of this phenomenon have already been proposed, most of which involve the fluidization of a deep bed of solids in a vertical reactor, or the fluidization of a relatively thin horizontally flowing bed. More recently it has been found that for some purposes a relatively deep horizontally flowing bed has many advantages and in this connnection attention may be directed to copending application Serial No. 237,032 filed July 16, 1951, in which such a bed is used in the cooling of hot pulverulent materials. Similarly in copending applications Serial Nos. 267,886 and 300,994, now U. S. Patent No. 2,782,019, filed January 23, 1952 and July 25, 1952, respectively, it is shown how such a bed may be used in calcining operations, using either direct or indirect heating means.

Various other operations of physical and/or chemical nature may also be carried out using this type of bed and it very often occurs that it is desirable to seal off the bed and the space above it to form a plurality of completely independent zones. This is desirable, for instance, in the calcining of alumina where the volume of gas evolved at various stages in the operation as the temperature is raised varies greatly, or in operations where the composition of the gas evolved changes as the temperature increases. Similarly, it may be desired to follow a calcining operation with a cooling operation, according to the method set forth in the first above mentioned copending application in which case it will be desirable to seal off the cooling zone from the calcining zone.

The present invention provides a very simple and effective method of sealing off a deep horizontally flowing fluo-solid bed without interfering with the horizontal flow of the bed.

The zoning device of the invention is arranged to operate within apparatus for treating finely divided solids in a relatively deep fluo-solids bed which is caused to flow horizontally in a generally trough shaped tunnel defined by walls, a roof and a permeable floor through which fluidizing medium is passed upwardly into the fluidized bed. The device itself consists essentially of a weir extending from side to side of the tunnel to a level just below the normal level of the bed, an area of floor extending downstream from below the top of said weir, through which no fluidizing medium is passed, and an underflow baffle positioned within the space vertically above said area of floor and extending from side to side of the tunnel from the roof thereof to a point below the level of the top of the weir but downstream thereof.

The weir may consist of a vertical baffle, an inclined baffle, or alternatively may be generally wedge-shaped i. e. essentially triangular in longitudinal section, so that its base coincides with the area of floor through which no fluidizing medium is passed.

The underflow baffle may be a simple vertical baffle or have a vertical portion extending from the roof to a point below the level of the bed on the downstream side of the device and an inclined portion generally parallelling the downstream face of the weir in the case where the latter is rearwardly inclined. In the latter case the flow characteristics of the device are improved, and may, according to a preferred embodiment of the invention, be improved still further by introducing a small flow of gas (i. e. a "gas-purge") at the lower end of the inclined portion of the underflow baffle, so that the gas flows up the underside thereof to form a cushion which reduces the resistance of the surface of the baffle to flow of the solid material passing through the device.

In cases where it is desired to use different fluidizing media in each of the zones divided off by the zoning device of the invention, separate chambers for different fluidizing media may be divided from each other by a wall extending across the gas chamber immediately below the weir described above.

The invention will be understood more fully by reference to the following specification taken in conjunction with the accompanying drawings wherein:

Figure 1 is a fragmentary cross sectional view of a deep bed horizontal flow fluo-solids apparatus, illustrating a zoning device according to the inevntion, dividing the bed into a zone A and zone B;

Figure 2 is a fragmentary longitudinal section through an apparatus for treating finely divided solids embodying a zoning device according to the invention wherein the weir is wedge-shaped;

Figure 3 is a view, similar to that in Figure 2 of a further embodiment of the invention, and illustrating the use of a "gas-purge" to improve the flow characteristics of the device;

Figure 4 is a longitudinal section taken through an apparatus divided into zones C, D, E and F, by zoning devices according to the invention illustrating the different nature of operations which may be carried out, in separate zones using the zoning device of the present invention, and Figure 5 is a cross-section of the device taken along the line 5—5 in Figure 4.

Referring now more particularly to the drawings, a zoning device according to the invention is illustrated in Figure 1 which is a fragmentary longitudinal section of an apparatus for treating finely divided material in a deep, horizontally flowing fluidized solids bed.

The fluidizing trough or tunnel is generally trough shaped and is provided with a bottom 10 which is permeable to the fluidizing media used but impermeable to the finely divided solids in the bed. The trough 1 provided with a roof or cover 11 and fluidizing medium passing upwardly through the bed 12 of finely divided solid material causes it to assume a somewhat expanded fluidized state with a well defined surface 13 at which the fluidizing medium separates from the bed 12 and passes out of the apparatus upwardly through the stack 14. The trough or tunnel may be provided with a feed chamber 29, the particulate material to be treated being introduced through opening 30 at the top thereof and entering the fluidizing trough through opening 31 at the bottom thereof.

The zoning device illustrated comprises an overflow baffle 15 extending from side to side of the trough or tunnel from the floor 10 thereof to a point below the surface 13 of the fluidized bed 12, and spaced apart from the baffle 15 generally parallel thereto and on the downstream side thereof is the underflow baffle 16 which also extends from side to side of the trough from the roof thereof to a point somewhat below the level of the top of the overflow baffle. The portion 17 of the floor of the chamber immediately below the space defined by the two baffles 15 and 16 is made impermeable to the fluidizing media used or, alternatively, passage of fluidizing medium through this portion of the floor of the chamber is prevented, for instance by impermeable block 17a. In the embodiment shown, different fluidizing media are being used to fluidize the bed in chambers A and B and the fluidizing media chamber is divided into chambers 18 and 19 by the partition 20 situated immediately below the space defined by the baffles 15 and 16. The fluidizing media chambers 18 and 19 are supplied with gas through supply lines 21 and 22 respectively.

The horizontal bed 12 flows horizontally through fluidizing chamber A. It is fluidized by gas $a$ supplied through the supply line 21 flowing into the fluidizing chamber A from the gas chamber 18, through the permeable floor 10 forming the bottom of the chamber. When the bed meets the overflow baffle 15 it flows over into the space contained between the baffle 15 and the baffle 16, and flows down the space under the influence of gravity and out beneath the underflow baffle 16. However, since the bottom of the chamber B is permeable to fluidizing media and gas $b$ is flowing through supply line 22, into chamber 19 and up into the fluidizing chamber B through the membrane 10, the solids become fluidized and fill the chamber B up to the level of the final overflow baffle (not shown) of the system at the end of the tunnel or trough. Since no fluidizing medium is introduced into the space between the baffles 15 and 16 this space naturally remains at all times filled to the level 13 with an unfluidized body of packed solids flowing downwardly under the influence of gravity.

The solids in the space between the baffles 15 and 16 offer a higher resistance to the flow of gases than the fluidized beds on both sides of the zoning device. The two baffles 15 and 16, therefore, positioned in the manner shown and separated by a section of floor through which no fluidizing medium passes, act as a lock preventing the mixing of the gases on both sides thereof provided, of course, that the pressures on both sides of the zoning device are reasonably within the same range.

While the arrangement illustrated in Figure 1 is satisfactory in operation, its resistance to flow of the horizontal bed is higher than may in some cases be desirable. It will be appreciated that the level of the top of the bed on the downstream side of a zoning device such as that of the invention will be slightly lower than that on the upstream side. This difference in level will, as is the case with fluid flow, be a function of the resistance to flow of a given obstruction. In many cases where the horizontal velocity of the fluidized bed is relatively rapid, it is desirable to design the zoning device so that it has better flow characteristics and accordingly less resistance to flow than the arrangement illustrated in Figure 1.

It has been found that, if the weir is inclined rearwardly (that is to say, with its lower edge downstream of its upper edge) at an angle which is greater than the natural angle of repose of the material being treated, so that the lower end of the baffle joins the floor at the forward end of the section thereof through which no fluidizing medium is passed, an improvement in flow characteristics occurs. While use of an inclined baffle by itself is advantageous from a flow point of view, it has been found desirable for purposes of eliminating dead areas within the apparatus to give the weir a wedge-shaped form, with the base of the wedge coinciding with the area of floor through which no fluidizing medium is passed, the downstream side corresponding to the rearwardly inclined baffle above mentioned, and the upstream side extending from the crest of the weir to the upstream side of the area of floor through which no fluidizing medium is passed. In the latter case it has been found to improve the flow characteristics of the device in respect of the area in the region of the crest of the weir if the upstream side of the wedge-shaped weir is forwardly (i. e. with its upper edge downstream of its lower edge) inclined at an angle between about 87 and 90° to the horizontal, or preferably between 88° and 89°.

One embodiment of the invention in which a wedge-shaped weir is used is illustrated in Figure 2 in which the weir consists of the wedge 40 having the rearwardly inclined downstream face 41, the slightly forwardly inclined upstream face 42 and the base 43 coinciding with the area 17 of floor 10 through which no fluidizing medium is passed. The area 17 prevents fluidization of the zone directly above it, and in order to seal the gases in chamber B effectively from those in chamber A it is essential to have the underflow baffle, which in this case is the vertical baffle 44, situated entirely within this space.

In accordance with the foregoing considerations, the included angle $\alpha$ between the area 17 and the downstream side 41 of the weir will be greater than the natural angle of repose of the material being treated. In the case of one type of powdered alumina it has been found that the most satisfactory angle is approximately 60° which happens to be about twice the natural angle of repose of that material. The included angle $\beta$ between the upstream side of the weir and the area 17 will suitably be 88° or 89° which gives a smoother flow in the bed directly above the weir.

Although the weir illustrated in Figures 2 and 3 have straight sides, it will be appreciated that in some cases the sides may be curved to some extent if desired without departing from the principle of operation described.

The device acts to a certain extent like an orifice, i. e. above a certain critical value it will pass only a constant amount of bed. The amount of material which can be passed through per unit of time depends upon the spacing S between the downstream side 41 of the weir and the underflow baffle 44 and the depth W to which the underflow baffle 44 extends below the level z—z of the crest of the weir. In many types of multiple installation and particularly in plants comprising indirect heat calciners according to my copending application 300,994 filed July 25, 1952 use may be made of this characteristic to control the level and rate of horizontal flow of beds in banks of such calciners, the fluidizing chamber on the upstream side of the weir acting as a surge bin.

A further embodiment of the invention in which a wedge-shaped weir is used is illustrated in Figure 3 wherein the underflow baffle consists of a vertical portion 45 extending from the roof of the tunnel down to a point below the level 13b of the bed B on the downstream side of the weir, and the inclined portion 46 which runs from the bottom of the vertical portion 45 downwardly in general parallelism to the downstream side 41 of the weir 40. In this case a further improvement in flow characteristics may be brought about by the introduction of a small quantity of gas, preferably the same kind as is used for the fluidization of the material in Chamber A to a point adjacent the lower edge of the portion 46 of the underflow baffle 44. This "gas-purge" may be introduced by means of a small tube having perforations in it such as gas-purge tube 47. In this case the gas-purge tube 47 will be disposed with the holes in it pointing substantially vertically and the gas expelled from the tube will rise and form a cushion along the under side of the inclined portion 46 of the underflow baffle 44 as illustrated generally by the small arrows. It has been found in practice that this arrangement will provide slightly better overall flow characteristics than can be obtained with the arrangements illustrated in Figure 1 or 2. It will be noted that, as in the case of Figure 2, the entire underflow baffle 44 is situated within the non-fluidized zone directly above the area 17.

The apparatus illustrated in Figure 4 is an example of an application of the invention to the design and operation of an electric tunnel kiln illustrating the usefulness of the invention in connection with a device of this nature. The kiln is designed for the calcination of alumina and is divided by means of zoning devices according to the invention, into four zones, C, D, E and F. These zoning devices may be of any design according to the invention and will normally be designed having regard to the material undergoing treatment. For simplicity of illustration, however, they are all illustrated as being in accordance with the embodiments illustrated in Figure 1. The bed flowing from C to F is heated gradually from 230° F. to 900° F. in zone C, from 900° F. to 2000° F. in zone D, is cooled from 2000° F. to 900° F. in zone E, and from 900° F. to 230° F. in zone F. Heating is accomplished by means of direct heat applied through the electrical heating elements 25 which are arranged in banks within the bed 12 suspended on supports 25a, as will be seen in Figures 4 and 5. The spacing and heat delivery of the heating elements 25 is arranged to produce the desired result in accordance with the teachings of my said copending application 300,994 filed July 25, 1952. The device illustrated generally in Figures 4 and 5 is also described in my said copending application and is reproduced here merely for the purposes of showing the use of the instant zoning device in connection therewith.

In zone C the hydrated alumina becomes dehydrated liberating about 1060 lbs. of water vapour per ton of alumina. The water vapour escaping from the product tends to fluidize the bed itself and it is practical to feed to this zone only a very small flow of the fluidizing gas c in order to keep the space velocities and dust losses of chamber C at a minimum. The temperature of the escaping gas c' is about 600° F. and it contains a very high percentage of water.

In zone D the alumina is heated from 900° F. to 2000° F. Since no gases are evolved, the amount of fluidizing gas must be kept much higher than in zone C. At the same time the temperature of the exit gas d' is about 1500° F. and the gas contains only a very small amount of moisture.

The fluidizing gas d fed to zone D is preferably dry and at a temperature of 1400° F. Since the purpose of zone E is to cool the calcined product, it is preferable to feed cold gas into zone E while in zone D a hot gas is preferable as a fluidizing media. The cold gas fed to zone E as a fluidizing medium will ultimately give a dry exit gas e' at a temperature of about 500° F.

It is desirable to use gas e' from zone E and f' from zone F as fluidizing medium for zones D and C after removing any entrained dust therefrom.

It is also a preferable practice to recover the substantial quantities of low-grade heat contained in gas c' by means of heat exchangers.

It will be apparent from the above that the effective sealing of the kiln illustrated in Figure 4 into zones C, D, E and F is highly useful and very important in enabling efficient operation of the process and full utilization of favourable factors developing during it. Furthermore the invention enables a high degree of heat economy.

In kilns designed for roasting low-sulfide ores, the zoning device of the invention can serve as a means for separating gases of different chemical composition and for obtaining fractions of gas having various concentrations of valuable components.

Similarly, the zoning device may be used to separate different reaction zones in other processes such as, for instance, in the chlorination of titanium ores, calcination of petroleum coke, etc.

It will be appreciated moreover that the present invention makes possible the effective fractionating of the product gases in fluosolid calcining operations at any desired temperature level. The device described is simple in design and can be applied at any place in the kiln or in the cooler. It can serve in a very wide range of applications and is both inexpensive to install and requires no maintenance.

What I claim as my invention is:

1. A zoning device for apparatus for treating finely divided solids in a relatively deep fluidized bed, which is caused to flow horizontally in a generally trough-shaped tunnel having sides, a roof, and a permeable floor through which fluidizing medium is passed upwardly into said bed, said device comprising; a weir extending from side to side of the tunnel, weir means comprising a baffle extending from side to side of the tunnel below the normal level of the bed and sloping to join the floor at an angle which on the downstream side of said baffle is greater than the natural angle of repose of the material which is to be treated in said apparatus; an area of floor extending downstream from below the top of said weir, impermeable to fluidizing medium; an underflow baffle extending across said tunnel from the roof thereof to a level below the top of said weir, said underflow baffle being positioned downstream of the top of said weir, entirely within the space above said area of floor impermeable to fluidizing medium and upstream of the point at which the baffle of said weir joins the floor; separate means in said tunnel upstream of said weir and downstream of said underflow baffle for removing spent fluidizing medium rising from said bed whereby the pressures on either side of said underflow baffle are maintained at substantially the same value, said weir and said underflow baffle, over portions thereof which overlap, being sufficiently closely spaced that in operation the finely divided material contained therebetween forms a dense unfluidized mass moving downwardly solely under the influence of gravity.

2. A zoning device as defined in claim 1 in which said baffle meets said area of floor impermeable to fluidizing medium at the downstream side thereof and at an angle which is greater than the natural angle of repose of the material which is to be treated in said apparatus.

3. A zoning device as defined in claim 2, comprising means for introducing a relatively small flow of gas adjacent the lower end of said underflow baffle on the upstream side thereof and across the width thereof, said flow of air being effective materially to reduce the resistance of said baffle to flow of finely divided solids downwardly past the same.

4. A zoning device as defined in claim 2 in which said underflow baffle comprises a first portion extending substantially vertically from the roof of the tunnel, to a level below the normal level of the bed on the downstream side of said zoning device, and a second portion inclining from said first portion downwardly in substantially parallel relationship to the downstream side of said weir to a level substantially below the top of said weir.

5. A zoning device as defined in claim 1 in which said weir is triangular in longitudinal section, with the base of said weir coinciding with said area of floor impermeable to fluidizing medium, the included angle formed by the upstream side of said weir and the floor of the tunnel being between about 87 and 90° and the included angle between the floor of the tunnel and the downstream side of said weir being greater than the natural angle of repose of the material being treated in said apparatus.

6. A zoning device as defined in claim 3 in which the included angle between the downstream side of the weir and the floor of the tunnel is about 60°.

7. A zoning device as defined in claim 3 in which said underflow baffle is vertical.

8. A zoning device as defined in claim 3 in which said underflow baffle comprises a first portion extending substantially vertically from the roof of the tunnel, to a level below the normal level of the bed on the downstream side of said zoning device, and a second portion inclining from said first portion downwardly in substantially parallel relationship to the downstream side of said weir to a level substantially below the top of said weir.

9. A zoning device as defined in claim 3, comprising means for introducing a relatively small flow of gas adjacent the lower end of said underflow baffle on the upstream side thereof and across the width thereof, said flow of air being effective materially to reduce the resistance of said baffle to flow of finely divided solids downwardly past the same.

References Cited in the file of this patent

UNITED STATES PATENTS 2,641,849    Lintz _____ June 16, 1953

UNITED STATES PATENT OFFICE

CERTIFICATE OF CORRECTION

Patent No. 2,797,908                                                        July 2, 1957

Boleslaw Joseph Zubrzycki

It is hereby certified that error appears in the above numbered patent requiring correction and that the said Letters Patent should read as corrected below.

In the grant, lines 1, 2 and 3, for "Boleslaw Joseph Zubrzycki, of Arvida, Quebec, Canada," read -- Boleslaw Joseph Zubrzycki, of Arvida, Quebec, Canada, assignor, by mesne assignments, to F. L. Smidth & Co., of New York, N. Y. --;  line 12, for "Boleslaw Joseph Zubrzycki, his heirs" read -- F. L. Smidth & Co., its successors --; in the heading to the printed specification, line 4, for "Boleslaw Joseph Zubrzycki, Arvida, Quebec, Canada" read -- Boleslaw Joseph Zubrzycki, Arvida, Quebec, Canada, assignor, by mesne assignments, to F. L. Smidth & Co., New York, N. Y. --; line 5, for "Application May 10, 1956, Serial No. 584,125" read -- Continuation of application Serial No. 267,885, January 23, 1952. This application May 10, 1956, Serial No. 584,125 --; in the drawings, Sheets 1 and 2, line 3, for "Filed May 10, 1956" read -- Original Filed January 23, 1952 --; in the heading to the drawings, Sheets 1 and 2, line 2, and in the heading to the printed specification, line 2, in the title, for "FLUO-SOLID" read -- FLUIDIZED SOLID --; Column 1, line 53, for "fluo-solid" read -- fluidized-solid --; line 57, and column 2, line 27, for "fluo-solids", each occurrence, read -- fluidized solids --; column 5, line 73, for "fluosolid" read -- fluidized solid --.

Signed and sealed this 26th day of August 1958.

(SEAL)
Attest:
KARL H. AXLINE

Attesting Officer

ROBERT C. WATSON
Commissioner of Patents